United States Patent
He et al.

(10) Patent No.: US 11,971,489 B2
(45) Date of Patent: Apr. 30, 2024

(54) METHOD AND DEVICE FOR CONVERTING STATE SPACE REPRESENTATION INFORMATION TO OBSERVATION SPACE REPRESENTATION INFORMATION

(71) Applicant: SHANGHAI HUACE NAVIGATION TECHNOLOGY LTD., Shanghai (CN)

(72) Inventors: Yutong He, Shanghai (CN); Xiaomeng Wu, Shanghai (CN); Jialin Zhang, Shanghai (CN)

(73) Assignee: SHANGHAI HUACE NAVIGATION TECHNOLOGY LTD., Shanghai (CN)

( * ) Notice: Subject to any disclaimer, the term of this patent is extended or adjusted under 35 U.S.C. 154(b) by 407 days.

(21) Appl. No.: 17/426,611

(22) PCT Filed: Mar. 5, 2020

(86) PCT No.: PCT/CN2020/077947
§ 371 (c)(1),
(2) Date: Jul. 28, 2021

(87) PCT Pub. No.: WO2021/174482
PCT Pub. Date: Sep. 10, 2021

(65) Prior Publication Data
US 2022/0317310 A1 Oct. 6, 2022

(51) Int. Cl.
*G01S 19/07* (2010.01)
*G01S 19/00* (2010.01)
*G01S 19/05* (2010.01)

(52) U.S. Cl.
CPC ............ *G01S 19/072* (2019.08); *G01S 19/07* (2013.01); *G01S 19/00* (2013.01); *G01S 19/05* (2013.01)

(58) Field of Classification Search
CPC ...... G01S 19/072; G01S 19/07; G01S 19/073; G01S 19/02; G01S 19/05
(Continued)

(56) References Cited

U.S. PATENT DOCUMENTS

| | | | |
|---|---|---|---|
| 11,624,838 B2 * | 4/2023 | Fine | G01S 19/30 342/352 |
| 2019/0113628 A1 | 4/2019 | Pratt et al. | |
| 2023/0184956 A1* | 6/2023 | Cole | G01S 19/41 342/352 |

FOREIGN PATENT DOCUMENTS

| | | | |
|---|---|---|---|
| CN | 106646522 A | 5/2017 | |
| CN | 107229061 A | 10/2017 | |

(Continued)

OTHER PUBLICATIONS

Zhang Bao-Cheng, et al., A method for processing GNSS data from regional reference networks to enable single-frequency PPP-RTK, Chinese Journal of Geophysics, 2015, pp. 2306-2319, vol. 58, No. 7.

(Continued)

*Primary Examiner* — Chuong P Nguyen
(74) *Attorney, Agent, or Firm* — Bayramoglu Law Offices LLC

(57) ABSTRACT

A method for converting state space representation (SSR) information to observation space representation (OSR) information includes: obtaining the SSR information, obtaining the OSR information, obtaining information of a virtual observation distance, and obtaining delay information of a troposphere and delay information of an ionosphere. A device for converting SSR information to OSR information includes: a satellite antenna, a global navigation satellite system (GNSS) board, a radio antenna, a mobile network module and antenna, a Bluetooth module and antenna, a Wi-Fi module and antenna, a status indicator light, a plurality of output interfaces, and a power supply unit. A conversion algorithm is realized for converting SSR information to OSR information, and the converted OSR information follows the international standard protocols and (Continued)

can be received by most GNSS receivers. A conversion device is developed based on the aforementioned method.

6 Claims, 2 Drawing Sheets

(58) Field of Classification Search
USPC ............... 342/352, 357.44, 357.935, 357.42
See application file for complete search history.

(56) References Cited

FOREIGN PATENT DOCUMENTS

| | | | | | |
|---|---|---|---|---|---|
| CN | 107561568 | A | | 1/2018 | |
| CN | 108490459 | A | | 9/2018 | |
| CN | 108919634 | A | | 11/2018 | |
| CN | 108923842 | A | * | 11/2018 | ............ G01S 19/03 |
| CN | 108923842 | A | | 11/2018 | |
| CN | 109752747 | A | | 5/2019 | |
| CN | 110072187 | A | | 7/2019 | |
| CN | 111123295 | A | * | 5/2020 | ............ G01S 19/07 |
| CN | 115356757 | A | * | 11/2022 | ............ G01S 19/40 |
| EP | 2372393 | A1 | | 10/2011 | |
| WO | 2019095122 | A1 | | 5/2019 | |
| WO | 2019117401 | A1 | | 6/2019 | |
| WO | WO-2019117401 | A1 | * | 6/2019 | ............ G01S 19/07 |
| WO | WO-2021146775 | A1 | * | 7/2021 | ............ G01S 19/25 |

OTHER PUBLICATIONS

Yuechen Wang, et al., Technical System Comparison between Satellite Based Augmentation System and Wide Area Precise Position System, 2019.

* cited by examiner

METHOD AND DEVICE FOR CONVERTING STATE SPACE REPRESENTATION INFORMATION TO OBSERVATION SPACE REPRESENTATION INFORMATION

CROSS REFERENCE TO THE RELATED APPLICATIONS

This application is the national phase entry of International Application No. PCT/CN2020/077947, filed on Mar. 5, 2020, the entire contents of which are incorporated herein by reference.

TECHNICAL FIELD

The present invention relates to the fields of global navigation satellite system (GNSS) positioning, navigation, autonomous driving, agricultural machinery guidance systems, satellite-based augmentation systems, ground-based augmentation, geographic information and others, and more particularly, to a method and device for converting state space representation (SSR) information to observation space representation (OSR) information.

BACKGROUND

OSR signals following the international standard protocols broadcasted by the prior satellite-based augmentation systems can be directly used by most of GNSS devices. However, the OSR signals require high communication bandwidth and low data delay. If the OSR signals are used directly, the satellite will operate with high power for a long time, which increases the loss of the satellite. Therefore, SSR information with a relatively small bandwidth are adopted to be broadcasted in use.

In the prior satellite-based augmentation systems, satellites broadcast SSR information to transmit differential data to users. However, such augmentation information is typically compressed in a special way and does not follow common international standards. Therefore, the SSR signal can only serve GNSS receivers of specific models and is not universally applicable. Most of the existing GNSS receivers on the market cannot use the SSR signal.

Moreover, the SSR signal broadcasted by the satellite-based augmentation system is expensive, which increases the use cost of the user and limits the application scope of key devices.

SUMMARY

To solve the foregoing problem that the common GNSS receivers cannot directly use SSR navigation augmentation signals, the present invention innovatively provides a method for converting SSR information to OSR information. The present invention further provides a forwarding device, which can simultaneously receive 4G SSR information or satellite SSR information, convert the SSR augmentation information to OSR information, and send the OSR information to a navigation positioning terminal through a Wi-Fi interface, a Bluetooth interface, an RJ45 interface, an RS232 interface, an RS485 interface, a radio interface and others, so that the navigation positioning terminal achieves the same effect as receiving the SSR information. In addition, the present invention provides a concept of integrated and compatible design for satellite antennas of a plurality of frequency bands such as L band and S band, which can reduce the size of the antennas and receive multi-frequency signals simultaneously.

To achieve the above objective, the present invention provides the following technical solutions. A method for converting state space representation (SSR) information to observation space representation (OSR) information includes: obtaining the SSR information, obtaining the OSR information, obtaining information of a virtual observation distance, and obtaining delay information of a troposphere and delay information of an ionosphere.

Preferably, the step of obtaining the SSR information specifically includes: obtaining difference code bias (DCB) of a satellite orbit, a satellite clock error, the ionosphere, the troposphere, an antenna phase center offset (PCO), an antenna phase center variation (PCV), a solid Earth tide and a hardware delay. The SSR information is broadcasted by a satellite, a mobile network, or a radio station.

Preferably, the step of obtaining the OSR information includes: obtaining data following a Radio Technical Commission for Maritime services (RTCM) protocol and a rearrangement including information of the RTCM protocol.

Preferably, the step of obtaining the information of the virtual observation distance includes: calculating a geometric distance between the satellite and a reference point according to coordinates of the reference point, and correcting the geometric distance according to the satellite clock error, the ionosphere, the troposphere, the antenna PCO, the antenna PCV, the solid Earth tide and the hardware delay to obtain the virtual observation distance.

Preferably, the step of obtaining the delay information of the troposphere and the delay information of the ionosphere includes: an extraction stage: extracting an absolute ionospheric value and an absolute tropospheric value unrelated to a reference station by using a precise point positioning (PPP) method; a modeling stage: constructing spatial-relation-based ionospheric and tropospheric parameters according to coordinates of a regional reference point; and a use stage: restoring an ionospheric delay amount and a tropospheric delay amount of the reference point according to a relationship between coordinates of a receiver reference point and coordinates of the regional reference point.

The present invention further provides a device for converting SSR information to OSR information, including: a satellite antenna, a global navigation satellite system (GNSS) board, a radio antenna, a mobile network module and antenna, a Bluetooth module and antenna, a Wi-Fi module and antenna, a status indicator light, a plurality of output interfaces, and a power supply unit.

Preferably, the satellite antenna simultaneously or separately receives signals from a geosynchronous equatorial orbit (GEO) satellite, a low-orbit satellite, and a GNSS satellite. 2G, 3G, 4G and 5G mobile communication networks are supported. The mobile network antenna may be integrated with the Bluetooth antenna and the Wi-Fi antenna. The plurality of output interfaces include a Wi-Fi interface, a Bluetooth interface, an RJ45 interface, an RS232 interface, an RS485 interface and a controller area network (CAN) interface. A current location and a broadcast ephemeris are obtained by using a built-in GNSS chip or an external device, and are combined with other SSR signals to generate OSR signals, wherein a built-in GNSS signal and a GNSS signal of the external device are used separately, or the built-in GNSS signal and the GNSS signal of the external device are synthesized and then used.

Preferably, in a path for implementing an enhanced positioning effect by transmitting information to a navigation positioning device after conversion, satellite signals received by a conversion terminal are from a GEO satellite, a low-orbit satellite, a GNSS satellite, and signals broadcasted by the satellites in the path include all or a part of features of SSR signals. Antennas receiving the satellite signals in the path receive L-, S-, C-, Ku-, and Ka-band signals. The OSR information is transmitted in the path to the navigation positioning device through a Wi-Fi interface, a Bluetooth interface, an RJ45 interface, an RS232 interface, an RS485 interface, a CAN interface and a radio interface. In the path, signals transmitted to the navigation positioning device include all or a part of features of OSR signals.

Preferably, in a path for implementing an enhanced positioning effect by transmitting information to a navigation positioning device after conversion, receiving network links of a conversion terminal are 2G, 3G, 4G and 5G, and communication protocols include Transmission Control Protocol (TCP), User Datagram Protocol (UDP), and Networked Transport of RTCM via Internet Protocol (NTRIP). The path includes a mobile communication module and antenna.

Preferably, in a path for implementing an enhanced positioning effect by transmitting information to a navigation positioning device after conversion and integration, a conversion terminal can simultaneously receive satellite signals and network signals, and integrate signals from a plurality of sources. In a path for implementing the enhanced positioning effect by transmitting information to the navigation positioning device, satellite signals received by the conversion terminal include data from the plurality of sources of a GEO satellite, a low-orbit satellite and a GNSS satellite, and data from a plurality of satellite links are integrated.

Compared with the prior art, the present invention has the following advantages.

1. In the present invention, errors of the orbit, clock error, frequency correction burst (FCB), ionosphere, and troposphere are decoupled through fine modeling of GNSS full errors, and are then converted by an OSR equation, so that high-precision real-time virtualization of observation values at any location in the service area is realized to convert the DCB into OSR information following the international standards.

2. The present invention provides a conversion device based on the aforementioned method, which is small in size and easy to install, so that the device can be installed on a conventional navigation receiver to receive SSR service information and convert the SSR service information to conventional OSR information, thereby realizing the function of serving a plurality of GNSS receivers by using one conversion device to enable the GNSS receivers to achieve the same effect as receiving the SSR information.

3. The present invention realizes a conversion algorithm for converting SSR information to OSR information, and the converted OSR information follows the international standard protocols and can be received by most of GNSS receivers. The present invention further develops a conversion device based on the aforementioned method, which can forward the OSR information to GNSS receivers, so that the GNSS receivers can obtain high-precision positioning results. In addition, the present invention provides a concept of integrated and compatible design for satellite antennas of a plurality of frequency bands such as L band and S band to miniaturize the device in the future. The method may reduce the cost of directly using SSR signals by users, which benefits users in fields such as precision agriculture, digital construction, marine engineering, and surveying and mapping.

DETAILED DESCRIPTION OF THE EMBODIMENTS

The technical solutions in the embodiments of the present invention will be described clearly and completely below with reference to the drawings in the embodiments of the present invention. Apparently, the described embodiments are merely a part, rather than all, of the embodiments of the present invention. All other embodiments obtained by those having ordinary skill in the art based on the embodiments of the present invention without creative efforts shall fall within the scope of protection of the present invention.

Figure 1:
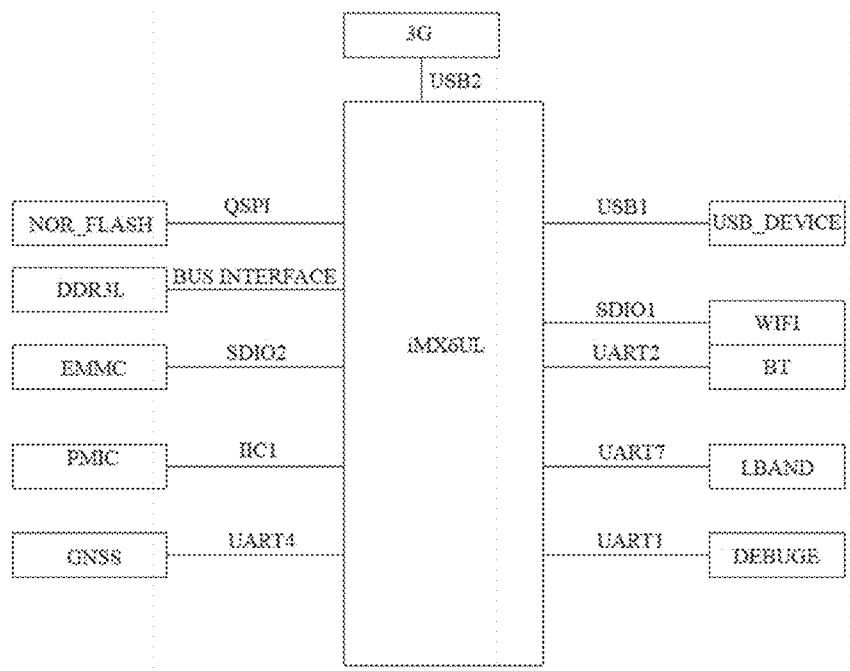
FIG. 1 and FIG. 2 are partial schematic diagrams of a device for converting SSR information to OSR information according to the present invention.
Figure 2:
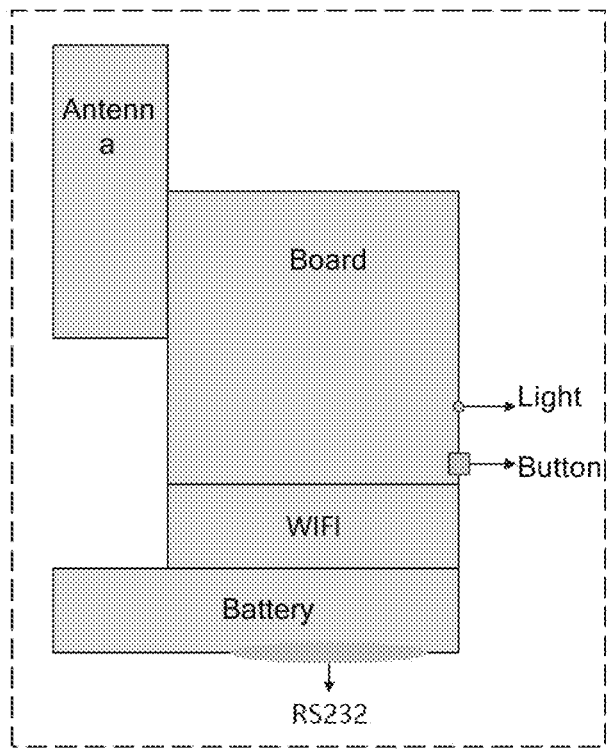
Figure 3:
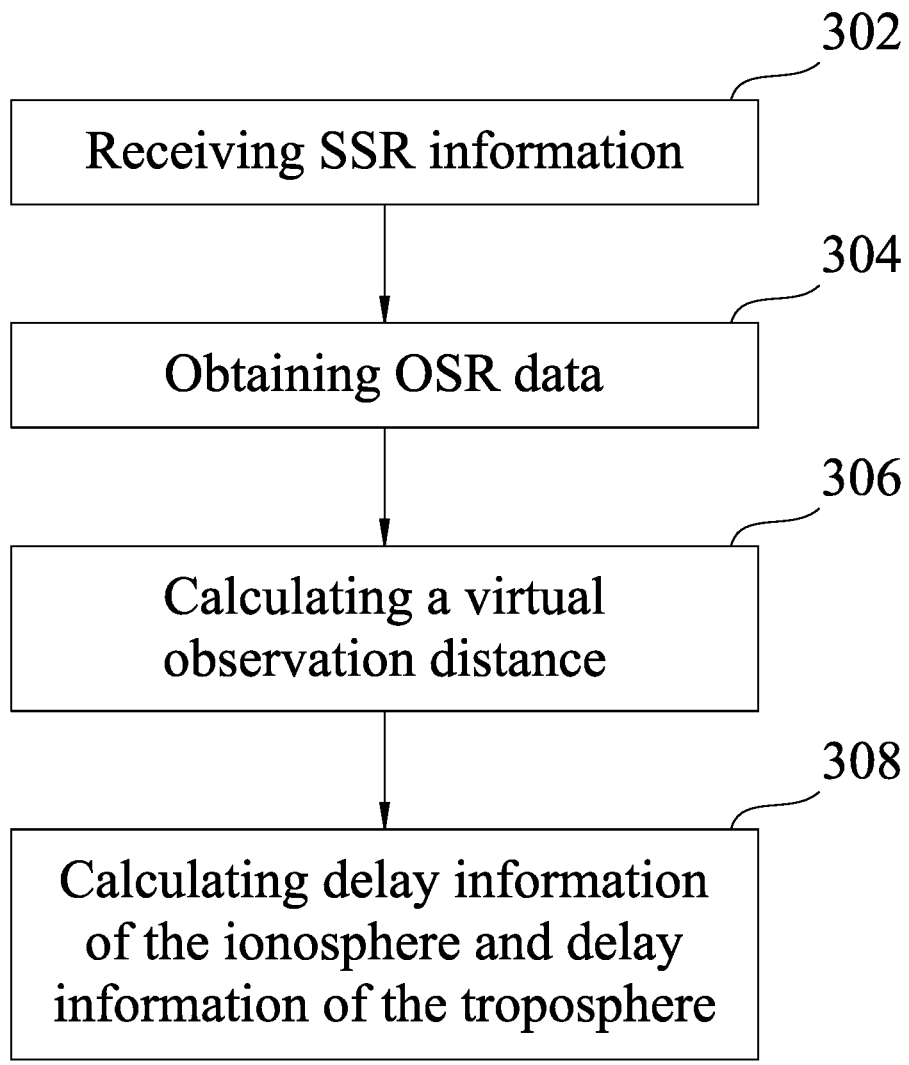
FIG. 3 is a flow diagram of a method for converting state space representation information to observation space representation information.

Referring to FIGS. 1, 2 and 3, a method 300 for converting SSR information to OSR information provided by the present invention includes: receiving SSR information at step 302, obtaining OSR data at step 304, calculating a virtual observation distance at step 306, and calculating delay information of the ionosphere and delay information of the troposphere at step 308. The step 302 of receiving the SSR information specifically includes: receiving DCB of a satellite orbit, a satellite clock error, the ionosphere, the troposphere, an antenna PCO, an antenna PCV, a solid Earth tide and a hardware delay. The SSR information is broadcasted by a satellite, a mobile network, or a radio station. The step 304 of obtaining the OSR data includes: obtaining data following an RTCM protocol and a rearrangement including information of the RTCM protocol. The step 306 of calculating the information of the virtual observation distance includes: calculating a geometric distance between the satellite and a reference point according to coordinates of the reference point, and correcting the geometric distance according to the satellite clock error, the ionosphere, the troposphere, the antenna PCO, the antenna PCV, the solid Earth tide and the hardware delay to obtain the virtual observation distance. The step 308 of calculating the delay information of the troposphere and the delay information of the ionosphere includes: an extraction stage: extracting an absolute ionospheric value and an absolute tropospheric value unrelated to a reference station by using a PPP method; a modeling stage: constructing spatial-relation-based ionospheric and tropospheric parameters according to coordinates of a regional reference point; and a use stage: restoring an ionospheric delay amount and a tropospheric delay amount of the reference point according to a relationship between coordinates of a receiver reference point and coordinates of the regional reference point.

In the present invention, a device for converting SSR information to OSR information includes: a satellite antenna, a GNSS board, a radio antenna, a mobile network module and antenna, a Bluetooth module and antenna, a Wi-Fi module and antenna, a status indicator light, a plurality of output interfaces, and a power supply unit. The satellite antenna simultaneously or separately receives signals from a GEO satellite, a low-orbit satellite, and a GNSS satellite. 2G, 3G, 4G, and 5G mobile communication networks are supported. The mobile network antenna may be integrated with the Bluetooth antenna and the Wi-Fi antenna. The plurality of output interfaces include a Wi-Fi interface, a Bluetooth interface, an RJ45 interface, an RS232 interface, an RS485 interface, and a CAN interface. A current location and a broadcast ephemeris are obtained by using a built-in GNSS chip or an external device, and are combined with other SSR signals to generate OSR signals. A built-in GNSS signal and a GNSS signal of the external device may be used separately, or the built-in GNSS signal and the GNSS signal of the external device may be synthesized and then used. In a path for implementing an enhanced positioning effect by transmitting information to a navigation positioning device after conversion, satellite signals received by a conversion terminal are from the GEO satellite, the low-orbit satellite and the GNSS satellite. Signals broadcasted by the satellites in the path include all or a part of features of the SSR signals. Antennas receiving the satellite signals in the path are capable of receiving L-, S-, C-, Ku-, and Ka-band signals. In the path, the OSR information is transmitted to the navigation positioning device through the Wi-Fi interface, the Bluetooth interface, the RJ45 interface, the RS232 interface, the RS485 interface, the CAN interface and a radio interface. In the path, signals transmitted to the navigation positioning device include all or a part of features of the OSR signals. In a path for implementing the enhanced positioning effect by transmitting information to a navigation positioning device after conversion, receiving network links of the conversion terminal are 2G, 3G, 4G, and 5G, and communication protocols include TCP, UDP, and NTRIP. The path includes a mobile communication module and antenna. In a path for implementing an enhanced positioning effect by transmitting information to a navigation positioning device after conversion and integration, the conversion terminal can simultaneously receive satellite signals and network signals, and integrate the signals from a plurality of sources. In a path for implementing an enhanced positioning effect by transmitting information to a navigation positioning device, satellite signals received by the conversion terminal include data from the plurality of sources of the GEO satellite, the low-orbit satellite and the GNSS satellite, and the data from a plurality of satellite links are integrated.

In the present invention, the following algorithms are implemented.

(1) Conversion Equation

Unlike the conventional algorithm in which relevant errors of satellite and base station locations are implied in observation quantities, the PPP-RTK algorithm realizes fine modeling for the satellite orbit, the satellite clock error, the ionosphere, the troposphere, the antenna PCO, the antenna PCV, the solid Earth tide, the hardware delay and others, so as to form a set of SSR-based correction amounts.

In the present invention, errors of the orbit, clock error, FCB, ionosphere, and troposphere are first decoupled based on the SSR-based correction amounts, and at any location within the service range, such SSR information can be converted to OSR information by using the following observation equations:

$$\phi = \rho + c(dt_R - dt^s) + T - I + \lambda N + B^s - b_R \quad (1),$$

$$P = \rho + c(dt_R - dt^s) + T + I \quad (2)$$

where, $\rho$ is a satellite-Earth distance, and can be obtained through calculation based on a reference point of the OSR information and a precise orbit; $dt^s$ is a satellite clock error; T and I are the troposphere and the ionosphere of the reference point, respectively, and can be obtained by fitting according to a regional modeling result; and $B^s$ is a satellite hardware delay. A receiver clock error $dt_R$, a receiver hardware delay BR, and ambiguity N, cannot be modeled precisely, but can all be eliminated through inter-satellite differential in OSR-based RTK positioning.

(2) Acquisition of Precise Atmospheric Parameters

In order to obtain high-precision atmospheric delay information, in the present invention, non-differential non-combined PPP is used to estimate ionospheric and tropospheric delays. After a fixed solution of PPP is obtained, atmospheric information is extracted for modeling. Non-differential PPP observation equations in use are as follows:

$$P_1 = \rho + c \cdot (dt_R - dt^s) + T - I_1 + dm_{P_1} + \varepsilon_{P_1}$$

$$P_2 = \rho + c \cdot (dt_R - dt^s) + T - \frac{f_2^2}{f_1^2} I_1 + dm_{P_2} + \varepsilon_{P_2}$$

$$L_1 = \rho + c \cdot (dt_R - dt^s) + T + I_1 + B_1 + dm_{L_1} + \varepsilon_{L_1}$$

$$L_2 = \rho + c \cdot (dt_R - dt^s) + T + \frac{f_2^2}{f_1^2} I_1 + B_2 + dm_{L_2} + \varepsilon_{L_2},$$

where, $P_1$ and $P_2$ are pseudo-range observation values; $L_1$ and $L_2$ are phase observation values; $\rho$ is a satellite-Earth distance; c is a speed of light in vacuum; $dt_R$ is a receiver clock error; $dt^s$ is a satellite clock error; T is a tropospheric delay; $I_1$ is an ionospheric delay at frequency $L_1$; $dm_{P_1}$ and $dm_{P_2}$ are pseudo-range multi-path delays; $dm_{L_1}$ and $dm_{L_2}$ are phase multi-path delays; $\varepsilon$ is measurement noise. When the phase integer ambiguity of the non-differential PPP is successfully fixed, the PPP can obtain a precise location solution at the centimeter level as well as the high-precision tropospheric delay correction amount T and ionospheric delay correction amount $I_1$ at the millimeter or centimeter level.

(3) Wide-Area Inter-Satellite Single-Difference Ionospheric Correction Model

With respect to an ionospheric model in a relatively large range with sparse base stations, a wide-area inter-satellite single-difference scheme may be employed for modeling. An oblique-path ionospheric delay is usually expressed as a combination of a projection function and a zenith ionospheric delay:

$$I^s = F \cdot mf^s \cdot VTEC^s,$$

where, F denotes a coefficient for conversion from a first frequency unit namely, total electron content unit (TECu), to a distance unit, where $$F = \frac{40.28 \times 10^{16}}{f_1^2};$$

mf denotes an ionospheric projection function, and VTEC denotes the zenith ionospheric delay.

$$mf = \frac{1}{\cos Z'}, Z' = \arcsin \frac{R_E \sin(\alpha \cdot z)}{R_E + H},$$

H=450 km, $R_E$ is the radius of the Earth, z is a zenith distance of a measurement station, and $\alpha$=0.9782.

A reference satellite is selected to calculate an equivalent oblique-path inter-satellite single difference:

$$\Delta \tilde{I}^s = \tilde{I}^s - \tilde{I}^{ref},$$

where, the superscripts s and ref represent a satellite number and a reference satellite number, respectively, and the other symbols have the same meaning as above. From the above formula, it is clear that the hardware delay at the receiver side can be eliminated through single-difference modeling.

With respect to a station network in regional or even wide-area (e.g., a continental plate) coverage, the zenith ionospheric delay VTEC in a region is usually modeled using a polynomial:

$$VTEC = \sum_{i=0}^{n}\sum_{j=0}^{m} E_{ij} \cdot (\varphi - \varphi_0)^i (S^s - S_0)^j,$$

where, n and m are the orders corresponding to the latitude and longitude, respectively; $E_{ij}$ is a parameter to be estimated in the model; $\varphi$ and $\varphi_0$ are a geodetic latitude of a satellite ionospheric penetration point at the moment of observation and a geodetic latitude of a modeling center, respectively; S and $S_0$ are a solar hour angle at the moment of observation and a solar hour angle in modeling, respectively.

The final model expression can be obtained as follows:

$$\Delta \tilde{I}^s = \left\{F \cdot mf^s \cdot \left(\sum_{i=0}^{n}\sum_{j=0}^{m} E_{ij} \cdot (\varphi^s - \varphi_0)^i (S^s - S_0)^j\right) + D^s\right\} - \left\{F \cdot mf^{ref} \cdot \left(\sum_{i=0}^{n}\sum_{j=0}^{m} E_{ij} \cdot (\varphi^s - \varphi_0)^i (S^s - S_0)^j\right) + D^{ref}\right\}.$$

During solution based on the ionospheric delay coefficient, a reference satellite needs to be selected for each satellite system of each measurement station, and a satellite with the highest altitude angle may be selected. When the zenith ionospheric model parameters are solved by using a reference station network formed by a plurality of measurement stations, normal equations for all measurement stations and all satellite systems in each epoch of the modeling period are superimposed.

In order to meet the real-time requirements, the model needs to achieve high accuracy for short-term forecasting. In the foregoing modeling, data in a short period before and after a reference moment may be used, and the optimal polynomial order may be set. In the modeling process, actually used stations are different in each period, and reference centers are also different theoretically in each modeling period. Therefore, the center point of the polynomial model should be calculated based on the distribution of measurement stations actually involved in the modeling. In addition, the polynomial model uses the vertical zenith ionospheric delay at the satellite penetration point as the observation value of the model, and the number of observation values of each station which participate in the modeling should also be taken into consideration during calculation of the modeling center, to calculate the geodesic coordinates of the modeling center point in a weighted manner. It should be noted that since the slant total electron content (STEC) includes the hardware delay at the receiver side, before interpolation is performed, the hardware delay at the receiver side is typically eliminated by using the STEC after the inter-satellite single difference.

(4) Local Ionospheric and Tropospheric Modeling

In a local area network, interpolation models are typically employed to achieve a relatively high model accuracy. Current models for modeling ionospheric and tropospheric local area network mainly include: a linear interpolation model (LIM), a low-order surface model (LSM), an inverse distance weighted (IDW) interpolation model, a linear combination model (LCM), and a least squares collocation (LSC) model, and others.

The present invention employs the LSM model added with an elevation factor, which is specifically shown in the following forms:

$$ZTD = a_0 \pm + a_1 dL + a_2 dB + a_3 dH$$

$$STEC = b_0 \pm + b_1 dL + b_2 dB + b_3 dH$$

where $a_0$ to $a_3$ are tropospheric model parameters; $b_0$ to $b_3$ are ionospheric model parameters; dL, dB, and dH are the latitude difference, the longitude difference, and the elevation difference from the reference station to the center point, respectively. The center point is typically a geometric center of all reference stations.

Elevation can be disregarded in a model for a gentle area. However, in an area where the elevation changes drastically, the interpolation accuracy can be increased by 60% by taking the elevation into consideration. Therefore, the elevation parameter is added to the model used in the present invention. It should be noted that since the STEC includes the hardware delay at the receiver side, before interpolation is performed, the hardware delay at the receiver side is typically eliminated by using the STEC after the inter-satellite single difference.

Embodiments are provided below.

Embodiment 1

Referring to FIGS. 1 and 2, a method for converting SSR information to OSR information includes the following features: SSR information, OSR information, a conversion equation, and a method for calculating ionospheric and tropospheric delays, which are described as follows:

Feature of SSR information: including DCB such as a satellite orbit, a satellite clock error, the ionosphere, the troposphere, an antenna PCO, an antenna PCV, a solid Earth tide, and a hardware delay, the SSR information being broadcasted by a satellite, a mobile network, or a radio station. Optionally, the SSR information may be broadcasted after being compressed or encrypted.

Feature of OSR information: data following an RTCM protocol and a rearrangement including information of the RTCM protocol.

Feature of conversion method: calculating a geometric distance between the satellite and a reference point according to coordinates of the reference point, and correcting the geometric distance according to the satellite clock error, the ionosphere, the troposphere, the antenna PCO, the antenna PCV, the solid Earth tide and the hardware delay to obtain a virtual observation distance.

Feature of a method for calculating ionospheric and tropospheric delays: an extraction stage: extracting an absolute ionospheric value and an absolute tropospheric value unrelated to a reference station by using a PPP method; a modeling stage: constructing spatial-relation-based ionospheric and tropospheric parameters according to coordinates of a regional reference point; and a use stage: restoring an ionospheric delay amount and a tropospheric delay amount of the reference point according to a relationship between coordinates of a receiver reference point and coordinates of the regional reference point.

Embodiment 2

A device for converting SSR information to OSR information according to the present invention includes a satellite antenna, a GNSS board, a radio antenna, a mobile network module and antenna, a Bluetooth module and antenna, a Wi-Fi module and antenna, a status indicator light, a plurality of output interfaces, a power supply unit, and others. The satellite antenna can simultaneously or separately receive signals from a plurality of satellites such as a GEO satellite, a low-orbit satellite, and a GNSS satellite. 2G, 3G, 4G, and 5G mobile communication networks are supported. The mobile network antenna may be integrated with antennas such as the Bluetooth antenna and the Wi-Fi antenna. The plurality of output interfaces include a Wi-Fi interface, a Bluetooth interface, an RJ45 interface, an RS232 interface, an RS485 interface, a CAN interface, and others.

The device in the present invention may be in the form of an independent terminal device, or a chip, or a module, or the like, or may be embedded in a GNSS device.

In the present invention, a current location and a broadcast ephemeris may be obtained by using a built-in GNSS chip or an external device, and be combined with other SSR signals, to generate OSR signals. A built-in GNSS signal and a GNSS signal of the external device may be used separately or used after being synthesized.

The present invention can support one or more navigation positioning devices.

Embodiment 3

In the present invention, this embodiment describes a path for implementing an enhanced positioning effect by transmitting correction amounts, which are broadcasted by satellites and converted by the terminal, to a navigation positioning device. In the path, satellite signals received by the conversion terminal may be from various satellites such as a GEO satellite, a low-orbit satellite, and a GNSS satellite, and the satellite frequency may belong to L-, S-, C-, Ku-, and Ka-bands. The signals broadcasted by the satellites in the path include all or a part of features of the SSR signals in the foregoing method for converting SSR information to OSR information. Antennas receiving the satellite signals in the path are capable of receiving signals from various frequency bands such as L-, S-, C-, Ku-, and Ka-bands. The conversion method included in the path are as described above. In the path, the OSR information can be transmitted to the navigation positioning device through the Wi-Fi interface, the Bluetooth interface, the RJ45 interface, the RS232 interface, the RS485 interface, the CAN interface, the radio interface, and others. In the path, signals transmitted to the navigation positioning device include all or a part of features of the OSR signals in the foregoing method for converting SSR information to OSR information.

Embodiment 4

In the present invention, this embodiment describes a path for implementing an enhanced positioning effect by transmitting correction amounts, which are broadcasted from network links and converted by the terminal in Embodiment 2, to a navigation positioning device. In the path, receiving network links of the conversion terminal may be 2G, 3G, 4G, 5G and others, and communication protocols include various protocols such as TCP, UDP, NTRIP and others. The path includes a mobile communication module and antenna. The rest of this embodiment is the same as Embodiment 3.

Embodiment 5

In the present invention, this embodiment describes a path for implementing an enhanced positioning effect by transmitting signals, which are simultaneously broadcasted by network links and satellite links and converted and integrated by the terminal in Embodiment 2, to a navigation positioning device. In the path, the conversion terminal can simultaneously receive the satellite signals in Embodiment 3 and the network signals in Embodiment 4, and integrate the signals from a plurality of sources. The rest of this embodiment is the same as Embodiment 3.

Embodiment 6

In the present invention, this embodiment describes a path for implementing an enhanced positioning effect by transmitting correction amounts, which are broadcasted by a plurality of satellites and converted by the terminal in Embodiment 2, to a navigation positioning device. In the path, satellite signals received by the conversion terminal include data from a plurality of sources such as the GEO satellite, the low-orbit satellite, the GNSS satellite and others, and the data from a plurality of satellite links are integrated. The rest of this embodiment is the same as Embodiment 3.

Embodiment 7

In the device for converting SSR information to OSR information according to the present invention, a concept of integrated and compatible design for antennas of a plurality of frequency bands such as L band and S band is proposed, which can reduce the size of the antennas and receive multi-frequency signals simultaneously, and needs to be protected.

It is obvious for those skilled in the art that the present invention is not limited to details of the above exemplary embodiments, and that the present invention may be implemented in other specific forms without departing from spirit or basic features of the present invention. The embodiments should be regarded as exemplary and non-limiting in every respect, and the scope of the present invention is defined by the appended claims rather than the above description. Therefore, all changes falling within the meaning and scope of equivalent elements of the claims should be included in the present invention. The reference numbers in the claims should not be considered as limiting the involved claims.

What is claimed is:

1. A method for converting state space representation (SSR) information to observation space representation (OSR) information for a satellite positioning system, the method being performed by a processor and comprising:

receiving the SSR information via at least one wireless receiver, said SSR information being broadcasted and comprising difference code bias (DCB) of a satellite orbit, a satellite clock error, the ionosphere, the troposphere, an antenna phase center offset (PCO), an antenna phase center variation (PCV), a solid Earth tide and a hardware delay;

obtaining OSR data comprising data following a Radio Technical Commission for Maritime services (RTCM) protocol and a rearrangement comprising information of the RTCM protocol, said OSR data defining a reference point;

calculating a virtual observation distance by calculating a geometric distance between the satellite and the reference point according to coordinates of the reference point defined by the OSR data and correcting the geometric distance according to the satellite clock error, the ionosphere, the troposphere, the antenna PCO, the antenna PCV, the solid Earth tide and the hardware delay to obtain the virtual observation distance;

calculating delay information of a troposphere and delay information of an ionosphere based at least on the satellite clock error by:

extracting an absolute ionospheric value and an absolute tropospheric value by using a precise point positioning (PPP) method, wherein the absolute ionospheric value and the absolute tropospheric value are unrelated to a reference station, constructing spatial-relation-based ionospheric and tropospheric parameters according to coordinates of a regional reference point, and restoring an ionospheric delay amount and a tropospheric delay amount of the reference point according to a relationship between coordinates of a receiver reference point and coordinates of the regional reference point; and providing the OSR information comprising the virtual observation distance and said delay information of the troposphere and of the ionosphere corresponding to the receiver reference point.

2. A conversion device configured to perform the method of claim 1, the conversion device comprising the processor and further comprising:
a satellite antenna,
a global navigation satellite system (GNSS) board,
a radio antenna,
a mobile network module,
a mobile network antenna,
a Bluetooth module,
a Bluetooth antenna,
a Wi-Fi module,
a Wi-Fi antenna,
a status indicator light,
a plurality of output interfaces, and
a power supply unit.

3. The device according to claim 2, wherein
the satellite antenna simultaneously or separately receives signals from a geosynchronous equatorial orbit (GEO) satellite, a low-orbit satellite, and a GNSS satellite;
2G, 3G, 4G and 5G mobile communication networks are supported;
the mobile network antenna is integrated with the Bluetooth antenna and the Wi-Fi antenna;
the plurality of output interfaces comprise a Wi-Fi interface, a Bluetooth interface, an RJ45 interface, an RS232 interface, an RS485 interface and a controller area network (CAN) interface;
the device is in a form of a separate terminal device, or a chip, or a module, or the device is embedded in a GNSS device;
a current location and a broadcast ephemeris are obtained by using a built-in GNSS chip or an external device, wherein a built-in GNSS signal and a GNSS signal of the external device are used separately, or the built-in GNSS signal and the GNSS signal of the external device are synthesized and then used; and
one or more navigation positioning devices are supported.

4. The device according to claim 2, wherein
in a path for implementing an enhanced positioning effect by transmitting information to a navigation positioning device after conversion, satellite signals received by a conversion terminal are from a GEO satellite, a low-orbit satellite, a GNSS satellite, and signals broadcasted by the satellites in the path comprise SSR signals;
antennas receiving the satellite signals in the path receive L-, S-, C-, Ku-, and Ka-band signals;
the OSR information is transmitted in the path to the navigation positioning device through a Wi-Fi interface, a Bluetooth interface, an RJ45 interface, an RS232 interface, an RS485 interface, a CAN interface and a radio interface; and
in the path, signals transmitted to the navigation positioning device comprise OSR signals.

5. The device according to claim 2, wherein
in a path for implementing an enhanced positioning effect by transmitting information to a navigation positioning device after conversion, receiving network links of a conversion terminal are 2G, 3G, 4G and 5G, and communication protocols comprise Transmission Control Protocol (TCP), User Datagram Protocol (UDP), and Networked Transport of RTCM via Internet Protocol (NTRIP);
the path comprises a mobile communication module and antenna.

6. The device according to claim 2, wherein
in a first path for implementing an enhanced positioning effect by transmitting information to a navigation positioning device after conversion and integration, a conversion terminal simultaneously receives satellite signals and network signals, and the conversion terminal integrates signals from a plurality of sources;
in a second path for implementing the enhanced positioning effect by transmitting information to the navigation positioning device, satellite signals received by the conversion terminal comprise data from the plurality of sources, wherein the plurality of sources comprise a GEO satellite, a low-orbit satellite and a GNSS satellite, and data from a plurality of satellite links are integrated; and
antennas of a plurality of frequency bands are designed in an integrated and compatible manner to reduce a size of the antennas and receive multi-frequency signals simultaneously, wherein the plurality of frequency bands comprise L band and S band.

* * * * *